United States Patent
Kim et al.

(10) Patent No.: US 9,182,506 B2
(45) Date of Patent: Nov. 10, 2015

(54) METHODS AND SYSTEMS FOR SIGNAL COMMUNICATION IN GAMMA RAY DETECTORS

(71) Applicant: General Electric Company, Schenectady, NY (US)

(72) Inventors: Chang Lyong Kim, Brookfield, WI (US); David Leo McDaniel, Dousman, WI (US)

(73) Assignee: General Electric Company, Schenectady, NY (US)

( * ) Notice: Subject to any disclaimer, the term of this patent is extended or adjusted under 35 U.S.C. 154(b) by 242 days.

(21) Appl. No.: 13/931,569

(22) Filed: Jun. 28, 2013

(65) Prior Publication Data

US 2015/0001403 A1    Jan. 1, 2015

(51) Int. Cl.
*G01T 1/16*    (2006.01)
*G01T 1/29*    (2006.01)
*G01T 1/164*    (2006.01)
*G01T 1/20*    (2006.01)

(52) U.S. Cl.
CPC .............. *G01T 1/2985* (2013.01); *G01T 1/16* (2013.01); *G01T 1/1641* (2013.01); *G01T 1/1642* (2013.01); *G01T 1/20* (2013.01); *G01T 1/2018* (2013.01); *G01T 1/2914* (2013.01)

(58) Field of Classification Search
CPC ....... G01T 1/1641; G01T 1/1642; G01T 1/20; G01T 1/2018; G01T 1/2914
See application file for complete search history.

(56) References Cited

U.S. PATENT DOCUMENTS

| | | | |
|---|---|---|---|
| 4,580,055 A | 4/1986 | Barfod | |
| 6,459,919 B1 | 10/2002 | Lys et al. | |
| 6,596,980 B2 | 7/2003 | Rusu et al. | |
| 7,308,296 B2 | 12/2007 | Lys et al. | |
| 2005/0128327 A1* | 6/2005 | Bencuya | H01L 27/14603 348/308 |
| 2011/0147567 A1 | 6/2011 | Grazioso et al. | |
| 2012/0068050 A1* | 3/2012 | Mazzillo et al. | 250/208.1 |

FOREIGN PATENT DOCUMENTS

WO    2006111883 A2    10/2006

OTHER PUBLICATIONS

Search Report and Written Opinion from corresponding PCT Application No. PCT/US2014/041679 dated Aug. 22, 2014.

\* cited by examiner

*Primary Examiner* — Yara B Green
(74) *Attorney, Agent, or Firm* — Dean D. Small; The Small Patent Law Group, LLC (57) ABSTRACT

Methods and systems for signal communication in gamma ray detectors are provided. One gamma ray detector includes a scintillator block having a plurality of scintillator crystals and a plurality of light sensors coupled to the scintillator crystals and having a plurality of microcells. Each of the plurality of light sensors have a local summing point in each of a plurality of signal summing regions, wherein the local summing points are connected to the plurality of microcells. The plurality of light sensors also each include a main summing point connected to the plurality of local summing points, wherein the main summing point is located a same distance from each of the local summing points.

20 Claims, 4 Drawing Sheets

METHODS AND SYSTEMS FOR SIGNAL COMMUNICATION IN GAMMA RAY DETECTORS

BACKGROUND OF THE INVENTION

The subject matter disclosed herein relates generally to gamma ray detectors, and more particularly, to systems and methods for communicating signals in gamma ray detectors.

Gamma ray detectors may be used in different applications, such as in Positron Emission Tomography (PET) systems. PET systems perform nuclear medicine imaging that generates a three-dimensional image or picture of functional processes within a body. For example, a PET system generates images that represent the distribution of positron-emitting nuclides within the body of a patient. When a positron interacts with an electron by annihilation, the entire mass of the positron-electron pair is converted into two 511 keV photons. The photons are emitted in opposite directions along a line of response. The annihilation photons are detected by detectors that are placed along the line of response on a detector ring. When these photons arrive and are detected at the detector elements at the same time, this is referred to as coincidence. An image is then generated based on the acquired image data that includes the annihilation photon detection information.

In silicon photomultiplier based PET detectors, in order to cover a large area for detection of gamma rays, a large number of small area silicon photomultipliers (e.g., 3×3 $mm^2$ or 4×4 $mm^2$ photomultiplier devices) may be used. However, the large number of these photomultipliers increases the complexity of the devices, as well as the number of readout channels, which can result is higher cost and higher power requirements. For example, signals from a number of silicon photomultipliers may be added using multiplexing schemes. However, in order to provide input signal integrity, very low noise and high bandwidth amplifiers are used.

In order to reduce the number of channels, as well as the complexity of handling many small individual pixels (e.g., a one anode device or a one anode per pixel device), larger sized silicon photomultipliers may be used with different multiplexing schemes. The larger sized silicon photomultipliers reduce the number of signal channels that are processed. However, the total capacitance increases and stretches the tail of the signal pulses as the total capacitance is proportional to decay time. These stretched signal pulses have a lower amplitude and reduce the signal amplitude, thereby decreasing timing performance. Also, the larger the area, the more spread in the signal transit time from each microcell of a SiPM pixel is inevitable. This degrades the timing performance too.

BRIEF DESCRIPTION OF THE INVENTION

In one embodiment, a gamma ray detector is provided that includes a scintillator block having a plurality of scintillator crystals and a plurality of light sensors coupled to the scintillator crystals and having a plurality of microcells. Each of the plurality of light sensors have a local summing point in each of a plurality of signal summing regions, wherein the local summing points are connected to the plurality of microcells. The plurality of light sensors also each include a main summing point connected to the plurality of local summing points, wherein the main summing point is located a same distance from each of the local summing points.

In another embodiment, a PET system is provided that includes a plurality of gamma ray detector as described above.

DETAILED DESCRIPTION OF THE INVENTION

The following detailed description of certain embodiments will be better understood when read in conjunction with the appended drawings. To the extent that the figures illustrate diagrams of the functional modules of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like). Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Various embodiments provide signal communication schemes and/or architectures for gamma ray detectors, particularly gamma ray detectors having Silicon photomultipliers (SiPMs). In particular, some embodiments provide different signal trace layouts or readout schemes for anode readout from the gamma ray detectors with a more uniform signal transmission distance from different locations of the gamma ray detectors. One or more technical effects of various embodiments include timing optimization (transit time optimization), less variation in the shape of signals from different locations of the detectors, and/or reduced overall capacitance, which increases signal amplitude (or gain). The gamma ray detectors may be used, for example, in Positron Emission Tomography (PET) systems or other systems, such as a PET—Magnetic Resonance Imaging (PET-MRI) systems. However, the various embodiments may be used with gamma ray detectors in non-medical imaging systems or non-imaging systems as well.

Figure 1:
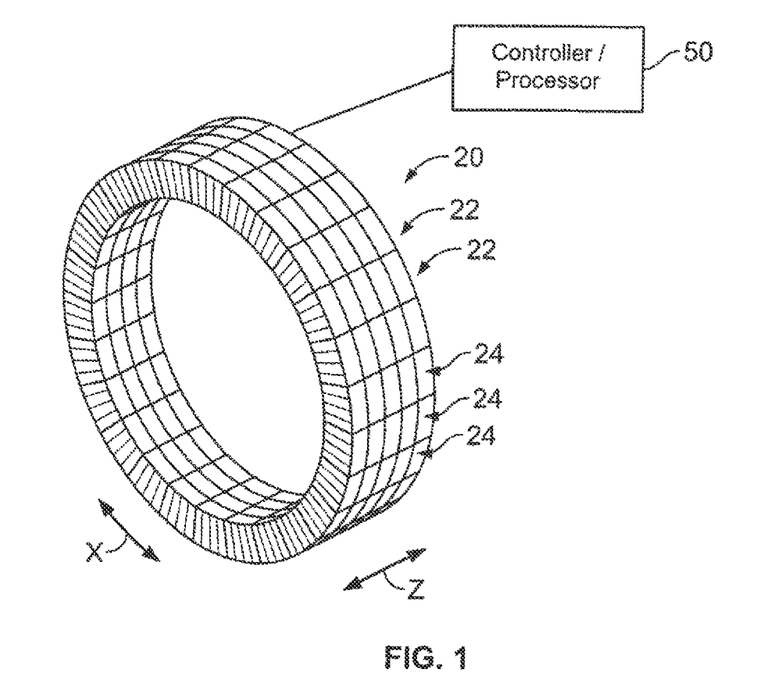
FIG. 1 is a perspective view of a positron emission tomography (PET) detector assembly in accordance with an embodiment.

Various embodiments may be used in combination with gamma ray detectors (also referred to herein as gamma detectors) in a PET system having a PET detector assembly 20 shown in perspective view in FIG. 1. However, it should be appreciated that the gamma detectors and various embodiments may be implemented in different types of imaging and non-imaging systems. In the illustrated embodiment, the PET detector assembly 20 is coupled to a controller/processor 50 that receives data or signals from the PET detector assembly 20 and may also provide control signals. The controller/processor 50 may receive gamma ray count data (e.g., coincidence count data) from a plurality of application specific integrated circuits (ASICs) connected to the PET detector assembly 20. Thus, the PET detector ring assembly 20 may be utilized to provide signals to the controller/processor 50.

In various embodiments, the PET detector assembly 20 includes a plurality of detector modules 22 that are arranged in a ring to form the PET detector ring assembly 20. Each detector module 22 is assembled from a plurality of detector units 24. Thus, a plurality of detector units 24 (also referred to as detector blocks) is assembled to form a single detector module 22, and a plurality of detector modules 22 is assembled to form the detector ring assembly 20. In one embodiment, the detector assembly 20 includes twenty-eight detector modules 22 that are coupled together such that the detector assembly 20 has a ring shape. In some embodiments, each detector module 22 includes five detector units 24 that are arranged in a 1×5 matrix. However, other numbers of detector units 24 in different configurations may be provided. It should be realized that the quantity of detector modules 22 utilized to form the detector assembly 20 is exemplary, and that the detector assembly 20 may have more than or fewer than twenty-eight detector modules 22. Moreover, it should be realized that quantity of detector units 24 utilized to form each detector module 22 is exemplary, and that the detector module 22 may have more than or fewer than twenty detector units 24.

Figure 2:
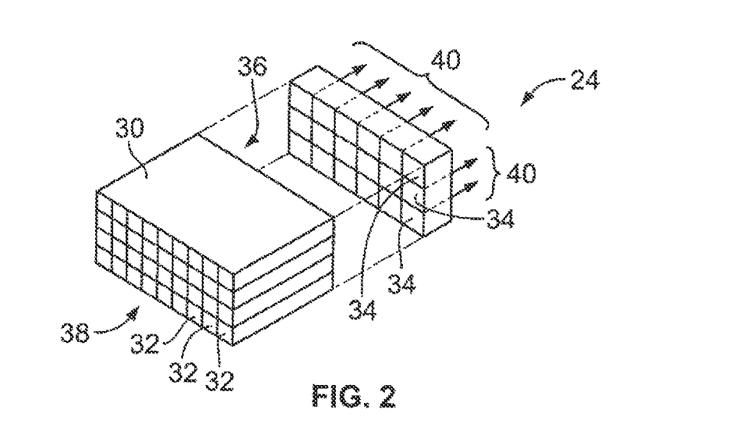
FIG. 2 is a perspective view of a detector unit formed in accordance with an embodiment.

FIG. 2 illustrates a single detector unit 24 comprising a plurality of scintillation crystals 32 that are impinged by the gamma rays and that may form a portion of the detector module 22 shown in FIG. 1. In various embodiments, the detector unit 24 includes a scintillator block 30 having the one or more scintillator crystals 32 that are arranged along an x-axis and a z-axis. In one embodiment, the scintillator block 30 has thirty-six crystals 32 that are arranged in a 4×9 matrix. However, it should be realized that the scintillator block 30 may have fewer than or more than thirty-six crystals 32, and that the crystals 32 may be arranged in a matrix of any suitable size. It also should be noted that the scintillator crystals 32 may be formed from any suitable material such as bismuth germinate (BGO), Cerium-doped Lutetium Yttrium Orthosilicate (LYSO) or Gadolinium Oxyorthosilicate (GSO), among others.

The detector unit 24 also includes a plurality of light sensors 34, illustrated as a plurality of photosensors, which may be any suitable photo-detectors that sense or detect light or other electromagnetic energy. In the illustrated embodiment, the light sensors 34 are SiPMs. The plurality of light sensors 34 are coupled at an end of the scintillator block 30 opposite a detector face 38. In various embodiments, the surfaces of the crystal block 30 not coupled to the light sensors 34 are covered with a reflective layer such as Teflon, TiO2 load Epoxy, or a spectral reflector. It should be noted that in some embodiments, a reflector or reflective material may be placed between some crystals in the block 30.

In some embodiments, the detector unit 24 has eighteen light sensors 34 on each end of the scintillator block 30 that are arranged in a 3×6 matrix. However, it should be realized that the detector unit 24 may have fewer than or more than eighteen light sensors 34 and that the light sensors 34 may be arranged in a matrix of any suitable size. For example, some embodiments include 36, 54 or 100 crystals 32 having corresponding light sensors 34 that are arranged in a 3×6 matrix, 6×6 matrix, 9×6 matrix or 10×10 matrix, respectively. It should be noted that in various embodiments, a one-to-one coupling between the light sensor 34 (e.g., a photosensor) and the crystal 32 is provided. However, in other embodiments a one-to-one coupling between the light sensor 34 (e.g., a photosensor) and the crystal 32 is not provided, such that there is a one-to-multiple coupling between the light sensor 34 and the crystal 32. Also, the light sensors 34 may have a different size or shape. In some embodiments, the light sensors 34 are larger than 6×6 mm$^2$. However, in other embodiments, larger or smaller light sensors 34 may be used, such as 4×6 mm$^2$ light sensors 34.

It should be noted that the crystals 32 utilized in an SIPM detector in some embodiments can be smaller than the crystals of the light sensors 34, as the area covered by an SiPM is smaller than the area covered by a light sensors 34. For example, a scintillation crystal area of about 4×4 cm$^2$ may include up to or more than 100 SSPMs.

In one embodiment, the light sensors 34 are avalanche photodiodes that are connected in parallel and operated above a breakdown voltage in a Geiger mode. For example, the light sensors 34 may be SiPMs in various embodiments that are configured as single photon sensitive devices formed from an avalanche photodiode array on a silicon substrate. However, it should be noted that the light sensors 34 may be any type of solid state light sensor, for example, any type of photodiode.

In operation, the scintillator crystals 32 convert the energy, deposited by a gamma ray impinging on the scintillator crystal 32, into visible (or near-UV) light photons. The photons are then converted to electrical analog signals by the light sensors 34. More specifically, when a gamma ray impinges on any one of the scintillators 32 in a detector unit 24, the scintillator detecting the gamma ray converts the energy of the gamma ray into visible light that is detected by the light sensors 34 in the detector unit 24. Thus, in the exemplary embodiment, each detector unit 24 is configured to output "n" analog or digitized signals 40.

The scintillator crystals 32 may form a rectangular matrix of crystal elements. Each scintillator crystal 32 may be rectangular or square in shape such that a compact array can be formed. Some gamma rays strike a scintillator crystal 32 with no scattering, i.e., the ray deposits all its energy in the scintillator crystals 32. Other gamma rays may strike an electron within the scintillator crystal 32 and deposit a fraction of energy there, and then impinge a proximate scintillator crystal 32. This phenomenon is referred to as a Compton scattering event. In the latter case the gamma ray energy is absorbed in both scintillator crystals 32.

Thus, the energy deposited in the detector unit 24 of FIG. 2 (i.e., energy incident on any of an M×N matrix of the scintillation crystals 26) is determined and read out by the light sensors 34. The energy in the light sensors 34 may be combined to determine the total incident energy. For example, anger logic may be used to determine the specific scintillation crystal 26 that was struck by the incident gamma ray.

Accordingly, detection by the ring(s) of detectors, namely the PET detector assembly 20 (shown in FIG. 1) is based on the principle that two photons detected in close temporal proximity (e.g., within less than about 7 nanoseconds (ns) by the two oppositely disposed detector units 24 in a single ring) are likely to have originated from a single annihilation event in the patient's body somewhere along a line that connects the two detectors. All of the coincidence events detected during an imaging session are recorded by the PET scanner as raw data. Such a simultaneous detection is termed a "coincidence." The coincidence data in PET imaging is reconstructed by a computer to produce cross-sectional images in the axial, sagittal and/or coronal planes, such as using the controller/processor 50.

The electron-positron decays cause the emission of two 511 keV gamma photons at almost 180 degrees apart. Accordingly, it is possible to localize the source along a straight line of coincidence (also referred to as a line of response or LOR) connecting the two detected gamma photons. In practice, the LOR has a finite width as the emitted photons are not exactly 180 degrees apart. It should be noted that if the resolving time of the detector units 24 (also referred to as the temporal window) is greater than about 1 ns, it is difficult to localize the location of the origin of the gamma rays to a segment of the LOR. If the timing resolution is better than about 1 ns, the event can be localized to a segment of the LOR. This localization process is referred to as time-of-flight (TOF) detection and is used by PET systems to determine the time difference between the detection of the photons. These systems, thus, reduce the length of the LOR segment of interest and more precisely determine the location of the origin of the gamma ray. As the timing resolution improves, the signal-to-noise ratio (SNR) of the image also improves, requiring fewer events to achieve the same image quality.

The raw data collected by a PET scanner using the PET detector assembly 20 in some embodiments includes a list of coincidence events representing near-simultaneous detection of annihilation photons by the pair of oppositely disposed detectors. Using statistics collected from the coincidence events, a set of simultaneous equations for the total activity of each portion of tissue along many LORs can be solved, and thus a map of radioactivities, as a function of location for portions of tissue, is constructed and displayed. The resulting map shows the tissues in which the molecular probe, for example, a radiopharmaceutical, has become concentrated and can be interpreted by a nuclear medicine physician or radiologist.

Figure 3:
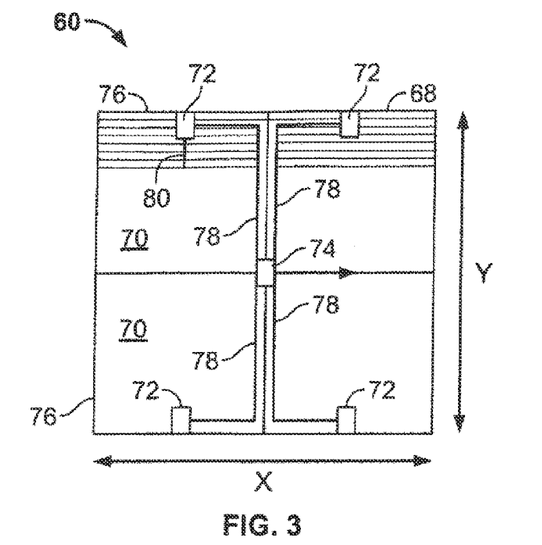
FIG. 3 is a schematic block diagram of a Silicon photomultiplier (SiPM) showing a signal summing arrangement in accordance with an embodiment.

Various embodiments of signal communication schemes and/or architectures will now be described. It should be noted that while specific signal trace arrangements are described, modifications are contemplated. FIG. 3 illustrates a SiPM 60 in accordance with an embodiment. The SiPM 60 may be a larger area SiPM, such as having dimensions of 6×6 mm$^2$ or 10×10 mm$^2$ (as compared to a smaller area SiPM having dimensions of 3×3 mm$^2$). However, it should be appreciated that the various embodiments may be used in connection with SiPMs having different sizes and shapes, such as rectangular instead of square. It also should be noted that a plurality of SiPMs 60 may be combined to form and array of SiPMs 60.

Figure 6:
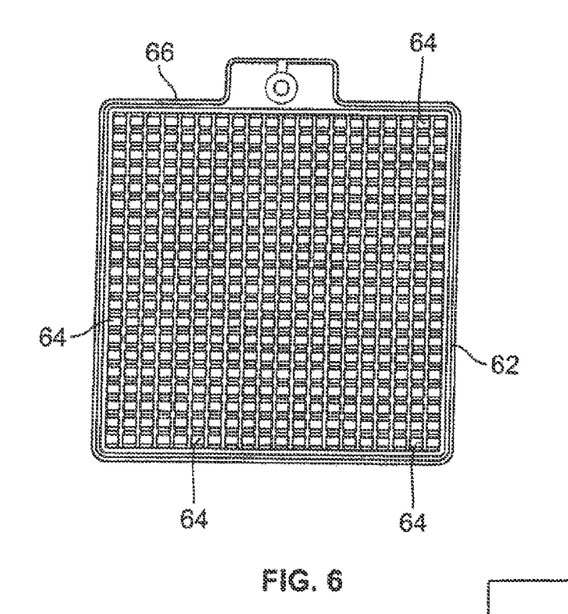
FIG. 6 is a diagram of an SiPM illustrating microcells.

The SiPM 60 includes a separate anode and is biased, namely, has a bias voltage applied thereto. As can be seen in FIG. 6, the SiPM 60 includes a plurality of microcells 64. In various embodiments each microcell 64 has dimensions of between about 25 micrometers (micros)×25 microns to about 100 microns×100 microns. However, larger or smaller microcells 64 may be provided. Accordingly, the SiPM 60 may include several thousand microcells 64, such as 4000 microcells 64 each having dimensions of 35 microns×35 microns or 50 microns×50 microns. It should be appreciated that more or less microcells 64 may be provided, such as 10,000 or more microcells 64. The microcells 64 may be connected in parallel in some embodiments in a PN junction (avalanche) arrangement and having a guard ring 66 surrounding the microcells 64.

In various embodiments, a plurality of signal traces 68 provides connection to the microcells as shown in FIG. 3. It should be noted that all of the signal traces 68 are not shown for ease of illustration (FIG. 3 illustrates some of the signal traces 68 along a top portion of the SiPM 60). As should be appreciated, as the signal traces 68 get longer when a pixel defined by the anode of the SIPM 62 gets larger (to reduce the number of channels), the inductance and resistance increases and the rise time of the signals increase (resulting also in an increase in the measured time of the gamma ray interaction and the variance of that measured time).

It should be noted that the signal traces 68 may be formed from any suitable material. For example, in one embodiment, the signal traces 68 are formed from copper or aluminum and have a thickness of about 1-2 microns. However, other materials may be used to form the signal traces 68, such as polycrystalline silicon (also known as polysilicon).

Additionally, as can be seen in FIG. 3, the SIPM 62 includes a plurality of signal summing regions 70, illustrated as four in FIG. 3. However, fewer or additional signal summing regions 70 may be provided as desired or needed, such as based on the size of the SIPM 62 or the power and signal requirements of the system. Thus, the quadrant structure of FIG. 3 is merely one example. Additionally, the signal summing regions 70 simply represent different areas of the SIPM 62 and are not separate structures, such as separated by dividers or physically separate. Thus, the lines dividing the SIPM 62 are merely representative of the different signal summing regions 70 and are not necessarily traces or other physical structures.

In the embodiment of FIG. 3, a plurality of local summing points 72 (or nodes) is provided. In the illustrated embodiment, one local summing point 72 is located within each of the signal summing regions 70. However, additional local summing points 72 may be provided as desired or needed. For example, in some embodiments, each of the local summing points 72 is a node where all of the signals from the corresponding signal summing region 70 are routed and added together. The local summing points 72 may combine signals from within the signal summing region 70 using any suitable signal combining technique, such as at signal nodes along the ends of the signal traces. Thus, the local summing points 72 may be any suitable point that receives the routed signals, such as a signal collection pad.

In some embodiments, the local summing points 72 include a buffer amplifier. Accordingly, the signal outputs from the buffer amplifier can be summed together at the local summing points 72. The buffer amplifier in some embodiments isolates the capacitance for the signal summing region 70, thereby reducing the capacitive effect. For example, as the capacitance from each of the signal summing regions 70 is isolated by the buffer amplifier, even as the length of the signals traces increases from the local summing points to a main summing point 74, little or no effect on the signal shape results as the main summing point 74 is only affected by the output capacitance of the buffer amplifier and the capacitance of the SiPM 60. It should be noted that any capacitance isolation circuit can be used instead of a buffer amplifier.

As can be seen in FIG. 3, the local summing points 72 are positioned in a same or similar position within each of the signal summing regions 70, for example, symmetrical with respect to the main summing point 74. For example, in the SiPM 60, the local summing points 72 are located at a centered location along an outer edge 76 of the SiPM 60. The outer edge 76 generally defines the dimensions of the SiPM 60. Thus, in the SiPM 60 the top two local summing points 72 as viewed in FIG. 3 are positioned at a top center of the respective signal summing region 70 and the bottom two local summing points 72 as viewed in FIG. 3 are positioned at a bottom center of the respective signal summing region 70. In various embodiments, each of the local summing points 72 is positioned within a respective signal summing region 70 such that the distance from the local summing point 72 to the main summing point 74 (illustrated in the middle or center of the SiPM 60) is the same or about the same. For example, as shown in FIG. 3, the signal traces 78 that route the summed signals from the local summing points 72 to the main summing point 74 are the same length or about the same length (within a predefined tolerance).

In various embodiments, the signal traces 78 are thicker than the signal traces 68 (e.g., four times the thickness). For example, in the illustrated embodiment, the signal traces 78 have a thickness of about 8 microns. However, the signal traces 78 may be thicker or thinner, such as 10-20 microns or 50 microns. It should be noted that the signal traces described herein may be any type of conductive trace.

In operation, signals in the signal traces 68 in a particular signal summing region 70 are combined at a respective local summing point 72. It should be noted that one or more additional signal traces 80 (one is shown in FIG. 3 for illustration, but more or less may be provided) may be provided to route the signals traveling in the x-direction (left or right in FIG. 3) to the y-direction (up and down in FIG. 3) to be summed at the respective local summing point 72. It should be noted that a plurality of signal traces 80 may be provided, for example, to form a grid type trace arrangement with the signal traces 68. However, in other embodiments, for example, a single signal trace 68 and/or 80 may interconnect each of a plurality of the microcells 64 (shown in FIG. 6) with the respective local summing point 72. Thus, depending on the configuration of the various traces, the signals within a respective signal summing region 70 may travel in the same or different direction. In some embodiments, the signal travels through a particular trace depending on the distance of the microcell 64 from the trace (e.g., signal travels to the closer trace). However, it should be appreciated that the signal flow through the signal traces 68 and 80 may be different (such as in the x-direction) so that the signals may be distributed among different ones of the signals traces. Accordingly, the signal traces within each signal summing region 70 form signal buses that communicate the signals from microcells 64 in a smaller region of the SiPM 60, defined by the signal summing regions 70, to a local summing point 72 (which are also positioned at a similar location relative to the main summing point 74). Accordingly, after the signals within respective ones of the signal summing region 70 are combined, the combined signals then travel the same or about the same distance to the main summing point 74.

It should be noted that the signal traces may be formed in any manner and using any suitable material. For example, in some embodiments the signal traces of various embodiments are aluminum traces formed by a metal deposition process on a Silicon device (e.g., silicon wafer), such as using a complementary metal-oxide-semiconductor (CMOS) process. In some other embodiments, other metals, such as copper or gold (or thicker traces) can be used to reduce the impedance and inductance of a trace. Additionally, the signal traces may be interconnected using any suitable process.

Thus, the signal traces within a signal summing region 70 route the signals to the local summing point 72 to combine the signals. The combined signals are then routed to the main summing point 74. The main summing point 74 may be connected to a pin-out or a through-via (e.g., a signal collection pad) that also may include a wire bond to output the final combined signal from the SiPM 60. Thus, in various embodiments, multiple local summing points 72 within the SiPM GO are used to provide signals having a more uniform response when routed out from the SiPM 60. It should be noted that the pin-outs may be wire bonded, for example, to a printed circuit board (PCB).

In various embodiments, the number of signal summing regions 70 is selected based on the particular application and/or particular properties or characteristics. For example, the tail length effect on the combined or final output signal from the main summing point 74 may be defined as (R_input× Total Capacitance)/number of signal summing regions, where R_input is the load impedance of the buffer amplifier. Accordingly, increasing the number of signal summing regions 70 decreases the tail length effect. However, as an increased number of signal summing regions 70 are used, the summing noise will also increase as a result of the number of buffer amplifiers. Thus, in various embodiments, the number of signal summing regions 70 is balanced with the amplifier noise, such as based on defined or predetermined values or parameters. In general, the decay time of the tail may be defined as: Quenching Resistance x Capacitance of One Microcell+Total Capacitance×Load Impedance of Amplifier (R_input).

It should be noted that the total capacitance of the SiPM 60 in various embodiments is reduced by 1/number of signal summing regions and the total impedance approximately reduced by 1/number of signal summing regions.

Thus, each of the signal summing regions 70 may include, for example, embedded additional electronics, such as a comparator, capacitance isolation circuit, energy processing circuit, and/or timing pickup/summing circuit. It should be noted that in some embodiments, the summed signal may be copied into an energy signal and a timing signal using a current buffer. For example, in case of a CMOS SiPM, the electronics can be implemented in the SiPM device itself at the summing point. Accordingly, energy signals may be used for location (X, Z) with a weighting factor and energy (E) determinations using the embedded electronics. It should be noted that the timing signal may be further converted to a trigger signal using an embedded comparator, such as when using a large monolithic device as the SiPM 60. In such a case, low power electronics and a cooling system to control the temperature of the SiPM 60 also may be provided. In some embodiments, for example, the main summing point 74 may include an energy circuit and/or a timing signal summing and shaping circuit, which can reduce noise and/or other stray capacitance and inductance.

Figure 4:
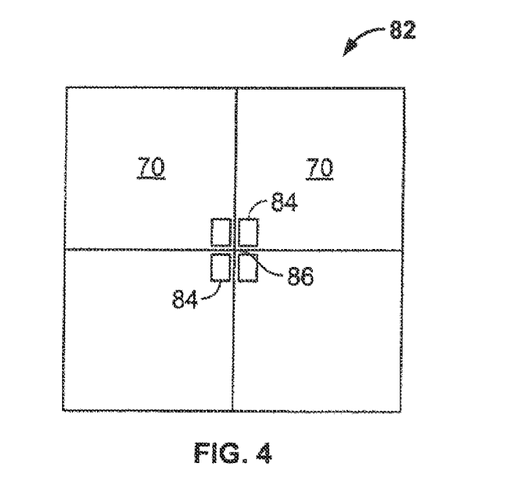
FIG. 4 is a schematic block diagram of a SiPM showing a signal summing arrangement in accordance with another embodiment.
Figure 5:
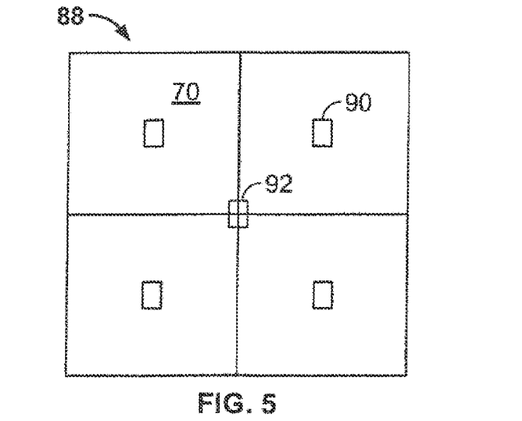
FIG. 5 is a schematic block diagram of a SiPM showing a signal summing arrangement in accordance with another embodiment.

Other configurations in accordance with various embodiments may be provided. For example, FIGS. 4 and 5 illustrate SiPMs 82 and 88, respectively having different configurations. It should be noted that like numerals represent like parts in the various Figures. As should be appreciated, in the various embodiments, the local summing point are arranged and/or positioned in the signal summing regions 70 such that length of the traces from the local summing points in each signal summing region to the main summing point is the same or about the same. It should be noted that the signal traces in FIGS. 4 and 5 are not shown for ease of illustration, but may be provided as described in more detail herein.

Thus, for example, FIG. 4 illustrates an SiPM 82 having four signal summing regions 70 wherein a local summing point 84 in each signal summing region 70 is positioned in close proximity to a main summing point 86 in the middle or center of the SiPM 82. In the illustrated embodiment, the local summing points 84 are positioned in the signal summing regions 70 in the corner of the signal summing region 70 that is adjacent the main summing point 86, for example, at the corner that in the middle of the SiPM 82. Thus, while some of the traces from the microcells to the local summing points 86 may be longer, the trace from the local summing points 86 to the main summing point 86 is shorter, for example, than in the SiPM of FIG. 3.

FIG. 5 illustrates an SiPM 88 wherein the local summing points 90 are located in a middle or center of each of the signal summing regions 70. In this embodiment, the main summing point 92 is located in a center or middle of the SiPM 88. It should be noted that in the embodiment of FIG. 5, as well as the other embodiments, the main summing point may be located in a position other than the center or middle of the SiPM, with the position of one or more the local summing points adjusted (e.g., offset within one or more of the signal summing regions 70 relative to the other signal summing regions 70).

It also should be noted that the wire-bonds or pads forming pin-outs may be provided in the SiPMs 82 and 88. The pin-out in various embodiments may be, for example, inside the anode, adjacent the anode, or slightly outside the anode area. It should be noted that through-via technology may be used, such that vias are provided through the SiPMs, such as when the pin-outs are provided in a center or middle of the SiPMs. For example, pin-outs may be connected to vias and the vias bump bonded to a PCB board.

It should be noted that the SiPMs may be formed using any known SIPM fabrication process in the art, which may be based on the particular configuration or operating characteristics of the SIPM.

It also should be noted that various embodiments may be used with different types of devices. For example, various embodiments may be implemented with a single diode device (or a discrete device). However, various embodiments may also be implemented with a monolithic device having two or more anodes on the same die.

Figure 7:
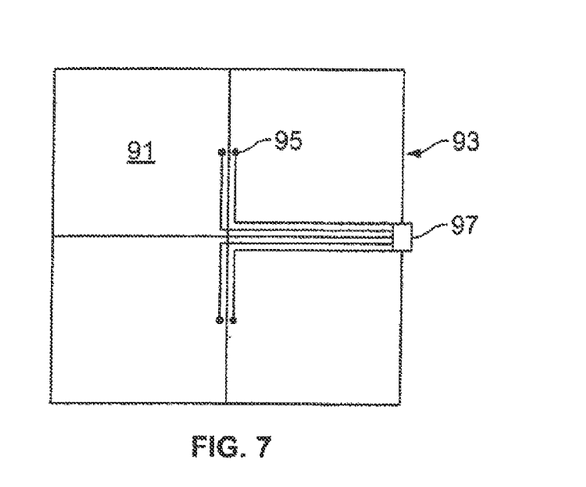
FIG. 7 is a schematic block diagram of a Silicon photomultiplier (SiPM) showing a signal summing arrangement in accordance with another embodiment.
Figure 8:
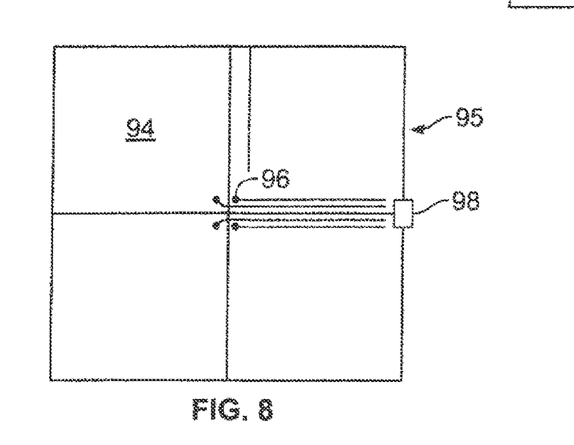
FIG. 8 is a schematic block diagram of a Silicon photomultiplier (SiPM) showing a signal summing arrangement in accordance with another embodiment.

Variations and modifications are contemplated. For example, in various embodiments, the main summing point is off-center or offset from the center of the SiPM, while having a substantially equal or equal distance to each of the plurality of local summing points. For example, as illustrated in FIGS. 7 and 8, a main summing point 97 and 98, respectively is not positioned at the middle of a SiPM 93 or 95, nut instead along an edge of the SiPM 93 or 95. It should be noted that while the main summing points 97 and 98 are located center along a left edge of the SiPM 93 or 95 as viewed in FIGS. 7 and 8, respectively, the main summing points 97 and 98 may be located along different edges and not centered along that edge. As can be seen, the local summing points 95 and 96 of the SiPM 93 and 95, respectively, are positioned in a respective signal summing region 91 and 94, such that the main summing point 97 or 98 is located about or substantially equal distance from the local summing points 95 and 96. In some embodiments, the main summing point 97 or 98 is located an equal distance from the local summing points 95 and 96.

Thus, in accordance with various embodiments, signal summing is located such that, for example, larger SiPMs may be used without having increased decay time for the output signal.

Figure 9:
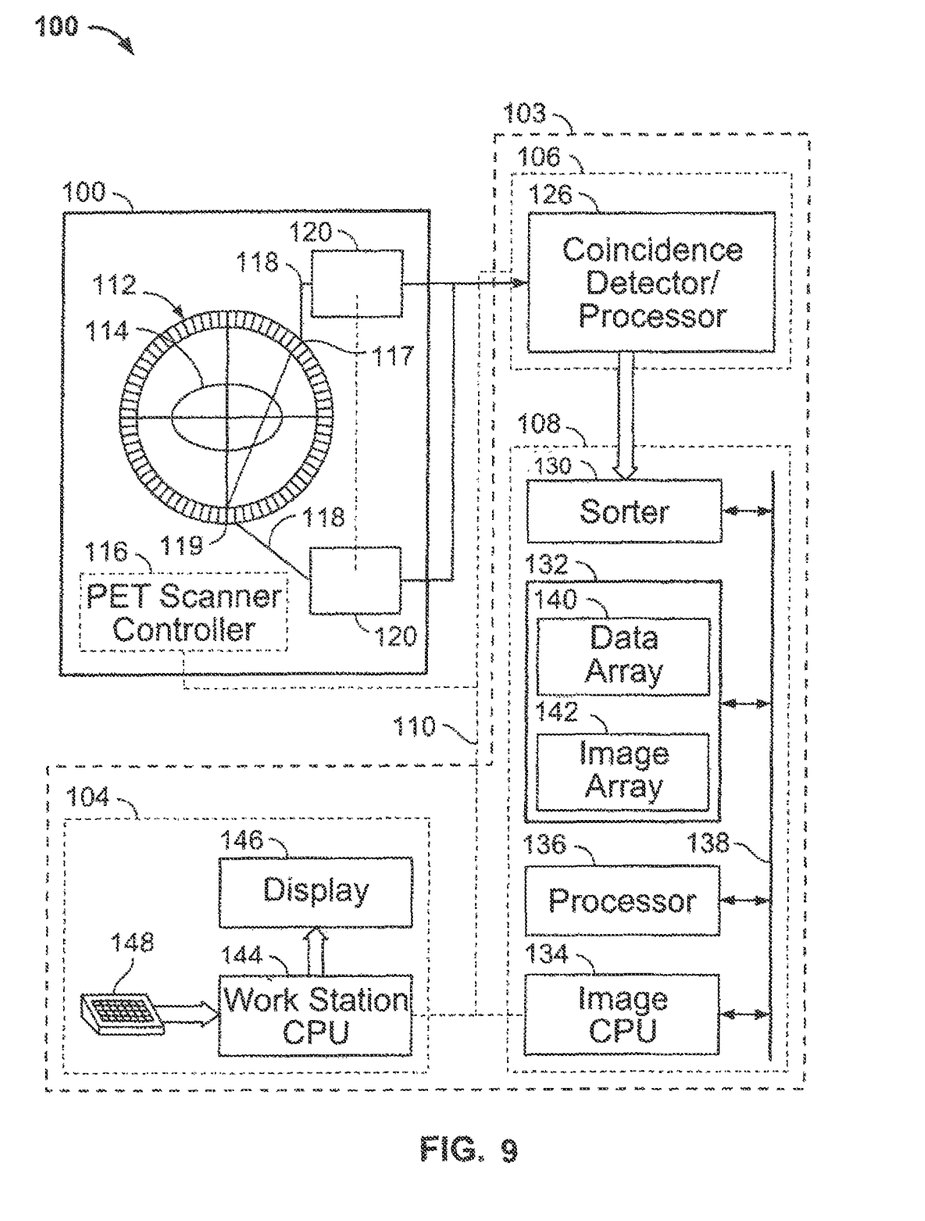
FIG. 9 is a diagram of a PET system in accordance with an embodiment.

FIG. 9 is a block diagram of an exemplary embodiment of a PET system 100 in which various embodiments of the invention may be implemented. The PET system 100 includes a PET scanner 101 and a controller 103 to control image reconstruction processes. The controller 103 includes an operator workstation 104 and a processor 105. The processor 105 includes a data acquisition processor 106 and an image reconstruction processor 108. The PET scanner 101, operator workstation 104, data acquisition processor 106 and image reconstruction processor 108 are interconnected via a communication link 110 (e.g., a serial communication or wireless link). The PET scanner 101, which typically includes a gantry (not shown), acquires scan data and transmits the data to the data acquisition processor 106. The operation of the PET scanner 101 is controlled from operator workstation 104. The data acquired by data acquisition processor 106 is reconstructed using image reconstruction processor 108.

The PET scanner 101 may operate, using, for example, a plurality of detector rings. One such detector ring, detector ring 112, is illustrated in FIG. 9, which may be embodied as the detector ring assembly 20 (shown in FIG. 1) that includes SiPMs formed in accordance with various embodiments. The detector ring 112 includes a central opening, in which an object 114 (e.g., a patient) may be positioned, using, for example, a motorized table that is aligned with the central axis of the ring 112. The motorized table moves the object 114 into the central opening of the ring 112, in response to one or more commands received from operator workstation 104. A PET scanner controller 116, also referred to as a gantry controller, is provided (e.g., mounted) in the PET scanner 101. The PET scanner controller 116 responds to the commands received from the operator workstation 104 through the communication link 110. Therefore, the operation of the PET scanner 101 is controlled from the operator workstation 104 through the PET scanner controller 116.

The detector ring 112 includes a plurality of detector elements for performing a PET scan of the object 114. For example, there may be 420 crystals per ring and 24 rings in the scanner. As shown in FIG. 10, the detector ring 112 includes a first detector element 117, a second detector element 119, and several other detectors. It should be noted that the detector elements are referred to as the first detector element and the second detector element, only to differentiate location in FIG. 9. The first detector element 117, like the other detectors, includes a set of scintillator crystals arranged in a matrix that is disposed in front of a plurality of photosensors (e.g., the light sensors 34) as described in more detail herein. When a photon impinges on a crystal on a detector, the photon produces a scintillation in the crystal. Each photosensor produces an analog signal on the communication line 118 when a scintillation event occurs. A set of acquisition circuits 120 is provided within the PET scanner 201 to receive these analog signals. The acquisition circuits 120 include analog-to-digital converters to digitize analog signals, processing electronics to quantify event signals and a time measurement unit to determine time of events relative to other events in the system. For example, this information indicates when the event took place and the identity of the scintillation crystal that detected the event. The acquisition circuits produce digital data indicating the location, time and total energy of the event. This event data is transmitted through a communication link, for example, a cable, to a coincidence detector or processor 126.

The coincidence detector 126 receives the event data packets from the acquisition circuits 120 and determines if any two of the detected events are in coincidence. In this context, the coincidence is determined by a number of factors. First, the time markers in each event data packet must be within a predetermined time period, for example, 6 ns, of each other. Secondly, the LOR formed by a straight line joining the two detectors that detect the coincidence event should pass through the field of view in PET scanner 101. Events that cannot be paired are discarded. Coincident event pairs are recorded as a coincidence data packet that is communicated through a communication link to a sorter 130 in the image reconstruction processor 108.

The image reconstruction processor 108 includes the sorter 130, a memory module 132, an image CPU 134, an array processor 136, and a back-plane bus 138. The sorter 130 counts all events that occur along each projection ray and organizes them into a coincidence data set. In one embodiment, this data set is organized as a data array 140, referred to as a sinogram. The data array 140 is stored in the memory module 132. The back-plane bus 138 is linked to the communication link 110 through the image CPU 134, which controls communication through the back-plane bus 138. The array processor 136 is also connected to the back-plane bus 138, receives the data array 140 as an input, and reconstructs images in the form of the image arrays 142. The resulting image arrays 142 are stored in the memory module 132.

The images stored in the image array 142 are communicated by the image CPU 134 to the operator workstation 104. The operator workstation 104 includes a CPU 144, a display device 146, and an input device 148. The CPU 144 connects to the communication link 110 and receives inputs (e.g., user commands) from the input device 148, which may be, for example, a keyboard, mouse, or a touch-screen panel. The operator can control the calibration of the PET scanner 101, the configuration of the PET scanner 201, and the positioning of the object 114 for a scan through the input device 148 and associated control panel switches. Similarly, the operator can also control the display of the resulting image on the display device 146 and perform image-enhancement functions, using programs executed by the workstation CPU 144.

The processor 105 is configured to process the scan data received from the detector elements. The scan data includes, for example, sinogram and timing information that is received by processor 105 from the detector elements during an imaging scan. The timing information in one embodiment is the difference in time at which two photons emitted in an annihilation event are detected by detector elements. The timing information may include time stamp information relating to a measured photon event detected by a pair of detector elements, for example, the first detector element 117 and the second detector element 119, for the PET system 100. The time stamp information is the time at which each photon is detected by a detector element, which in various embodiments.

The timing information is received by detectors, which include, for example, a block of 36 scintillator crystals attached to an array of photosensors. The scintillator crystals convert the incoming photon from the patient into a plurality (e.g., several thousand) of light photons (e.g., visible or near UV), which are detected by the photosensors. The proportion of light photons detected by each photosensor channel is used to determine which of the 36 crystals received the incoming photon. The timing signal is detemiined by processing the leading edge of the signals, to estimate the arrival of the light photons at the light sensors 34 of, for example, the SIPM. This timing signal is then digitized and processed subsequently.

The energy and timing information are used to reconstruct an image of the object 114, scanned by the PET system 100. The reconstruction may include, for example, a two-dimensional or three-dimensional reconstruction. The timing data of each detector element may be configured as a timing bias matrix with a timing recovery value for each set of projection rays of the PET system 100. It should be noted that a detector element pair detects the projection rays from a photon event. The timing bias data of each detector element pair corresponding to the projection ray is stored in the memory module 132 of the PET system 100.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid-state drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective Willis "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A gamma ray detector comprising:
   a scintillator block having a plurality of scintillator crystals; and
   a plurality of light sensors coupled to the scintillator crystals and having a plurality of microcells, each of the plurality of light sensors having,
      a local summing point in each of a plurality of signal summing regions, the local summing points are connected to the plurality of microcells by a plurality of first signal traces; and
      a main summing point connected to the plurality of local summing points by a plurality of second signal traces, wherein the main summing point is located a same distance from each of the local summing points, the plurality of first signal traces having a different thickness than the plurality of second signal traces.

2. The gamma ray detector of claim 1, wherein the main summing point is located substantially equal distance from each of the local summing point in the plurality of signal summing regions.

3. The gamma ray detector of claim 1, wherein the main summing point is located in a center of the light sensor.

4. The gamma ray detector of claim 1, wherein the main summing point is located in off-center in the light sensor.

5. The gamma ray detector of claim 1, comprising four signal summing regions each having a single local summing point located therein.

6. The gamma ray detector of claim 1, wherein the local summing point in each of the plurality of signal summing regions is symmetrically positioned relative to the main summing point.

7. The gamma ray detector of claim 1, wherein the local summing point in each of the plurality of signal summing regions is positioned in a center location along an edge of the light sensor.

8. The gamma ray detector of claim 1, wherein the local summing point in each of the plurality of signal summing regions is located within a center of the signal summing region.

9. The gamma ray detector of claim 1, wherein the local summing point in each of the plurality of signal summing regions is located at a corner of the signal summing region adjacent the main summing point.

10. The gamma ray detector of claim 1, further comprising at least one of a capacitance isolation circuit, buffer amplifier or timing pickup or summing circuit at each of the local summing points.

11. The gamma ray detector of claim 1, further comprising a pin-out connected to the main summing point.

12. The gamma ray detector of claim 11, further comprising a through via connected to the pin-out.

13. The gamma ray detector of claim 1, wherein the main summing point comprises at least one of an energy circuit or a timing signal summing and shaping circuit.

14. The gamma ray detector of claim 1, wherein the plurality of light sensors comprise one or more Silicon photomultipliers (SiPMs).

15. A Position Emission Tomography (PET) system comprising:
   a plurality of gamma ray detector elements configured to acquire scan data, the detector elements having scintillator crystals with a plurality of lights sensors, the plurality of light sensors having a plurality of microcells, each of the plurality of light sensors having,
      a local summing point in each of a plurality of signal summing regions, the local summing points are connected to the plurality of microcells by a plurality of first signal traces; and
      a main summing point connected to the plurality of local summing points by a plurality of second signal traces, wherein the main summing point is located a same distance from each of the local summing points, the plurality of first signal traces having a different thickness than the plurality of second signal traces.

16. The PET system of claim 15, wherein the main summing point is located substantially equal distance from the local summing point in each of the plurality of signal summing regions.

17. The PET system of claim 15, wherein the local summing point in each of the plurality of signal summing regions is symmetrically positioned relative to the main summing point.

18. The PET system of claim 15, wherein the plurality of light sensors further comprise at least one of a capacitance isolation circuit, buffer amplifier or timing pickup or summing circuit at each of the local summing points.

19. The PET system of claim 15, wherein the main summing point of the plurality of light sensors comprises at least one of an energy circuit or a timing signal summing and shaping circuit.

20. The PET system of claim 15, wherein the plurality of light sensors comprise one or more Silicon photomultipliers (SiPMs).

* * * * *